April 7, 1970     L. K. EVANS ET AL     3,504,869
ELECTRIC MISSILE CONTROL SYSTEM
Filed May 17, 1960     4 Sheets-Sheet 1
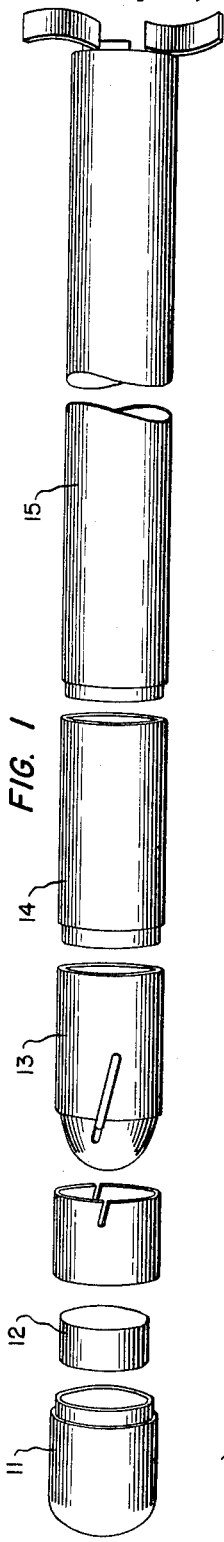
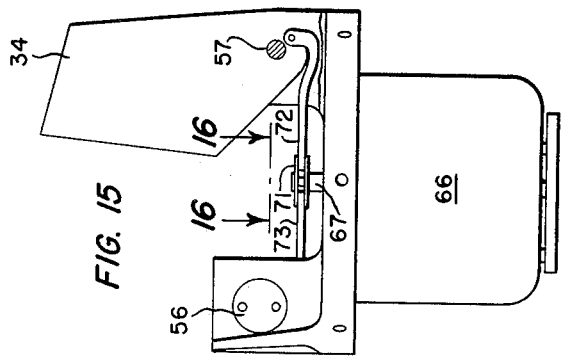
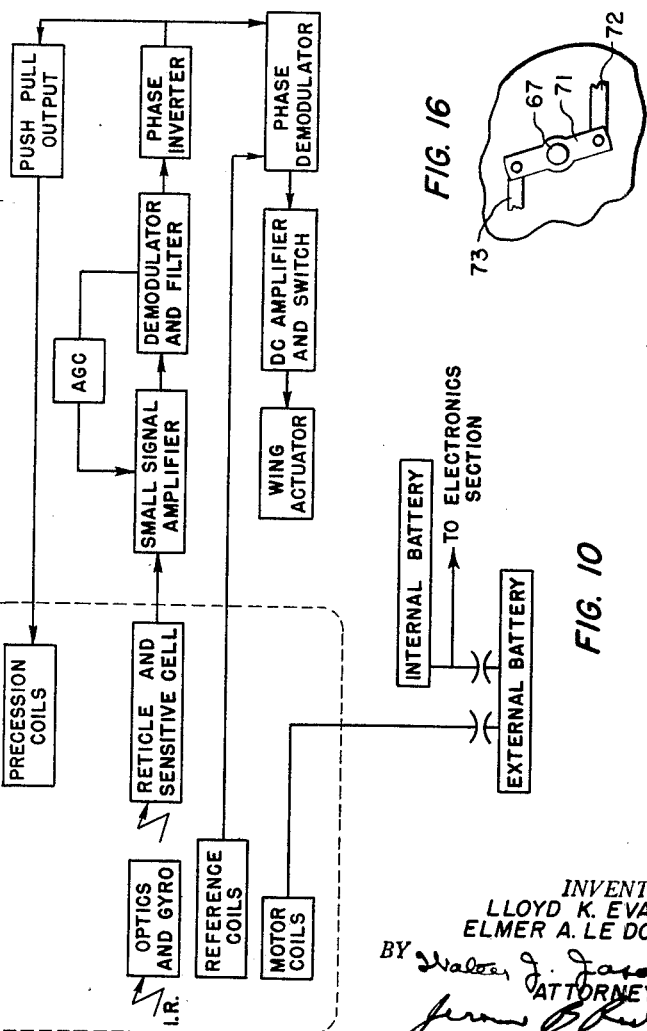
INVENTORS
LLOYD K. EVANS
ELMER A. LE DONNE April 7, 1970   L. K. EVANS ET AL   3,504,869
ELECTRIC MISSILE CONTROL SYSTEM
Filed May 17, 1960                    4 Sheets-Sheet 2
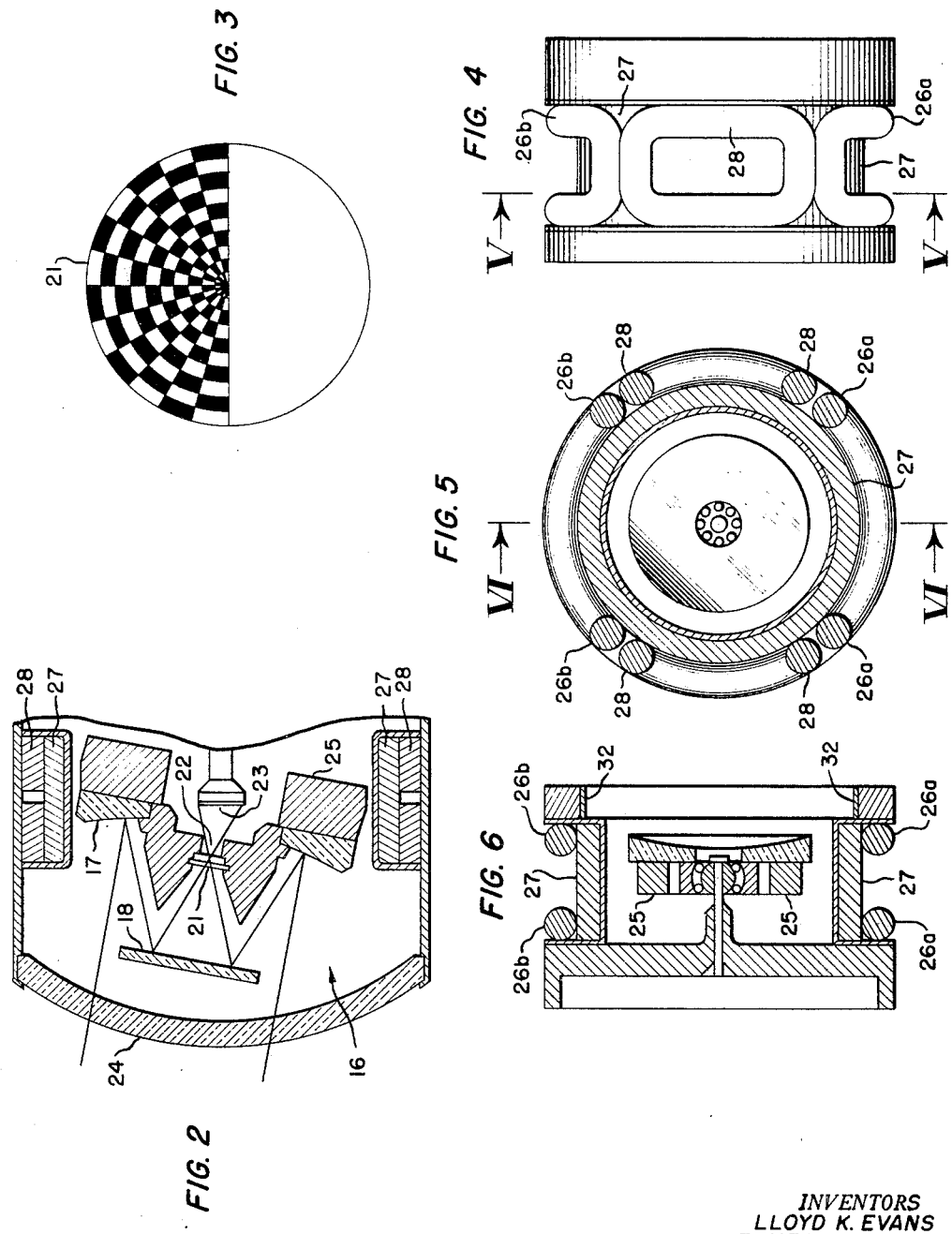
INVENTORS
LLOYD K. EVANS
ELMER A. LE DONNE
BY
ATTORNEY
AGENT

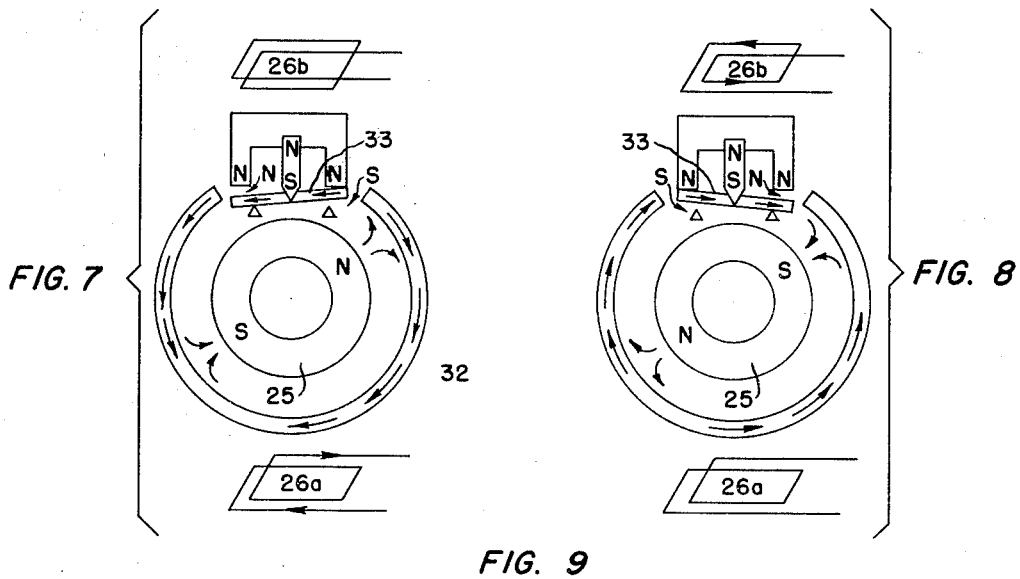
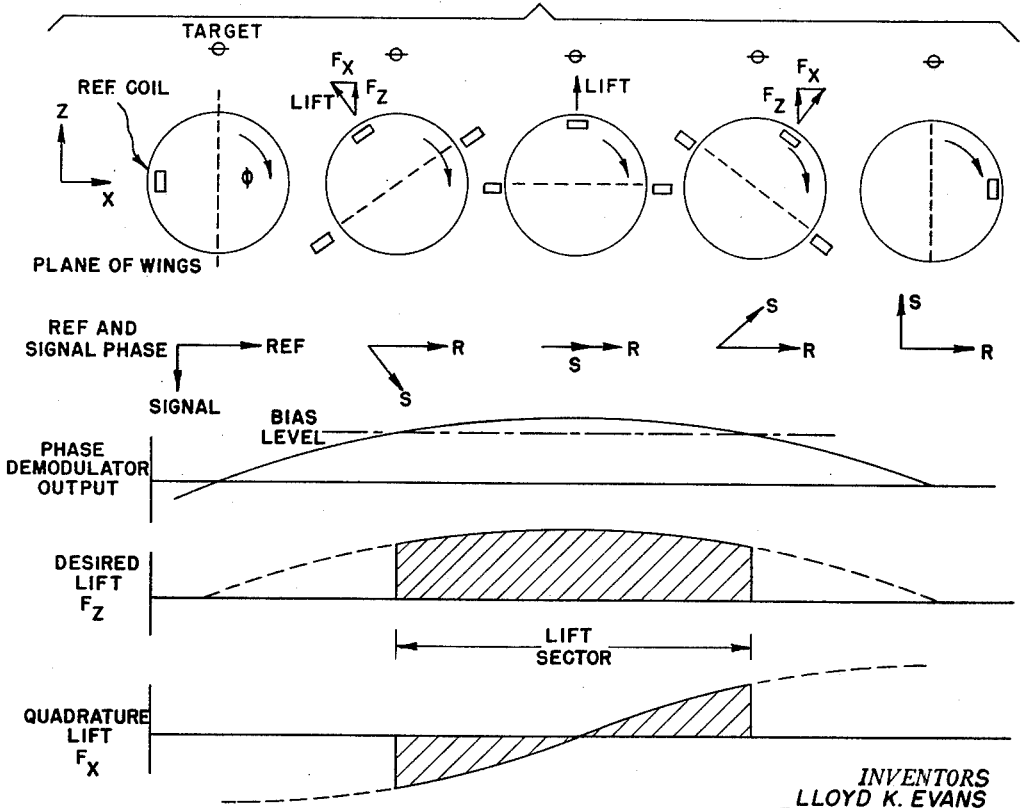

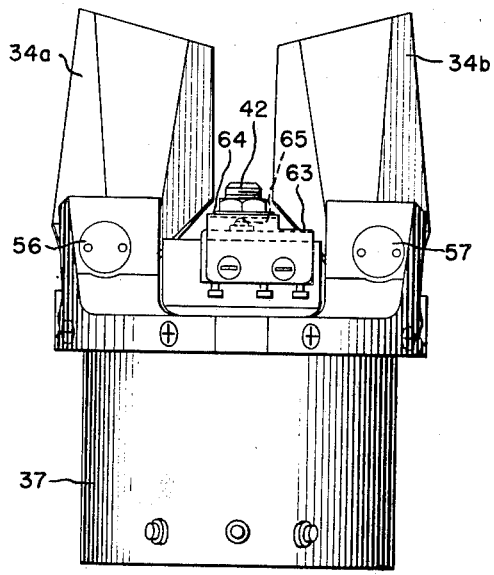
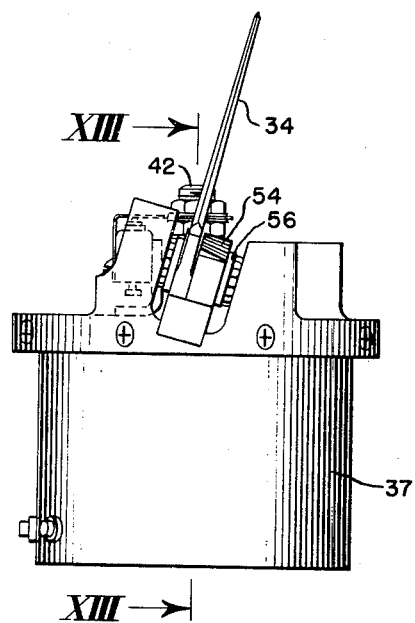
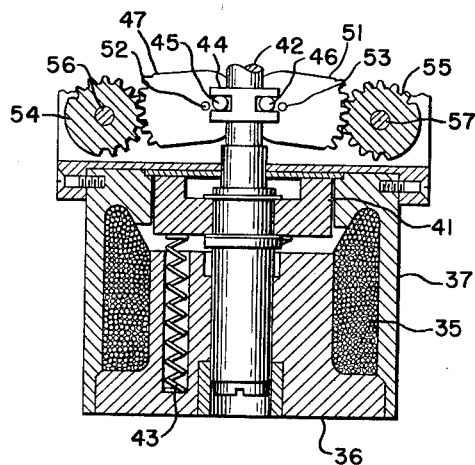
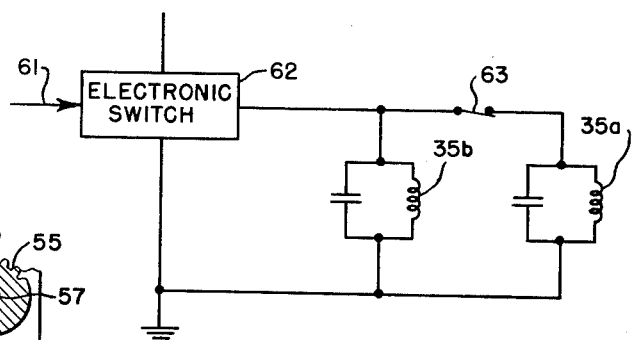

United States Patent Office 3,504,869
Patented Apr. 7, 1970

3,504,869
ELECTRIC MISSILE CONTROL SYSTEM
Lloyd K. Evans, West Covina, and Elmer A. Le Donne, Pomona, Calif., assignors to General Dynamics Corporation, San Diego, Calif., a corporation of Delaware
Filed May 17, 1960, Ser. No. 30,034
Int. Cl. G06f 15/50
U.S. Cl. 244—3.16                                                   1 Claim The present invention relates to a missile control system, and more particularly to a control system utilizing a pair of fixed incidence aerodynamic control surfaces which are rapidly extended into and retracted from the airstream electro-magnetically.

This control system is unusual in that it uses retractable control surfaces where other missiles use control surfaces that remain in the airstream. Only two control surfaces are used instead of the four usually necessary in a missile which maneuvers in three dimensions. The number of control surfaces required is reduced by utilizing the missile roll to achieve control in any direction. These novel features permit a simpler and lighter control system. The simplicity of the system increases a missile's reliability.

The preferred embodiment of this control system utilizes an optical infrared-homing head which senses the direction of flight path error in polar coordinates. An electromagnetic actuator extends the control surfaces during the proper portion of each missile revolution to correct the error.

An object of the present invention is to provide a more compact and comparatively small missile contol system.

Another object is to provide a more simple and thus more reliable missile control system.

Another object of this invention is to provide a spinning missile with electrically actuated control surfaces.

Another object of this invention is to provide electrical means to couple an infrared missile homing head to missile control surfaces.

Other objects and features of the present invention will be readily apparent to those skilled in the art from the following specification and appended drawings wherein is illustrated a preferred form of the invention, and in which:

FIGURE 1 is an exploded elevational view of a missile utilizing the control system described herein.

FIGURE 2 is a schematic illustrating seeker head operation.

FIGURE 3 shows the reticle used in the seeker head.

FIGURE 4 is a simplified diagram of the spin motor coils and reference coils.

FIGURE 5 is a cross section of FIGURE 4 taken along line V—V.

FIGURE 6 is a cross section of FIGURE 5 taken along line VI—VI of FIGURE 5.

FIGURE 7 illustrates one phase of magnetic switch operation.

FIGURE 8 illustrates another phase of magnetic switch operation.

FIGURE 9 shows how normal acceleration is controlled.

FIGURE 10 is a block diagram of the missile electronics.

FIGURE 11 shows one view of one electromagnetic control surface actuator.

FIGURE 12 is another view of an electromagnetic control surface actuator.

FIGURE 13 is a cross section taken along line XII of FIGURE 12.

FIGURE 14 illustrates the electrical connections of the actuator to the missile electronics of FIGURE 10.

FIGURE 15 illustrates an alternative electromagnetic control surface actuator.

FIGURE 16 is another view of the actuator of FIGURE 15.

To facilitate the description and explanation of operation of this invention it will be treated in the environment for which it is intended, i.e., a missile.

The missile shown in FIGURE 1 is exploded to show the seeker head 11, electronics 12, control section 13, warhead 14, and motor 15. The preferred seeker head 11 is further illustrated in FIGURE 2. It is a free gyro stabilized heat sensing mechanism. The function of this seeker is to provide a measurement of angular rate of the missile-to-target line of sight. The entire optical unit 16 is part of the rotating gyro mass or rotor. The optical portion of the head is a Cassegrain telescope but other types of telescopes could be used. An obvious alternate is the Gregorian telescope. As shown in FIGURE 2, incident energy is reflected by the gyro-mounted primary mirror 17 onto a secondary mirror 18 and focused onto a spinning reticle or chopper 21. Light passing through the reticle is filtered by a filter 22 and falls on a cell 23 which converts heat energy pulses to electrical pulses. The cell is stationary and does not rotate with the telescope. The cell responds best to a particular range of wavelengths of incident energy. The missile dome 24 and filter 22 must be transparent in this region and the coatings applied to the primary and secondary mirrors must be highly reflective here.

The reticle serves two functions in an infrared seeker: It provides discrimination against certain unwanted "targets" such as cloud edges and it permits sensing of tracking error by chopping the radiation passing to the sensitive cell. The reticle is illustrated in FIGURE 3.

FIGURE 4 shows the motor coils 26a and 26b which are used to spin the gyro, and precession coils 27 which are used to precess the gyro. Pickoff or reference coils 28 are used to sense gyro position. A magnetic switch 31 is provided to alternately energize the two motor field coils 26a and 26b which are placed diametrically opposite each other. FIGURE 5 clarifies the relative positions of the precession coils 27, reference coils 28, and motor coils 26a and 26b. FIGURE 6 is a simplified diagrammed cross-section of the rotating gyro. A portion of the gyro is a magnet 25 polarized in the plane of rotation. A mu-metal ring 32 picks up flux from the magnet and carries it to the magnetic switch 31 which is indicated in FIGURE 7.

FIGURES 7 and 8 illustrate the operation of the magnetic switch. In FIGURE 7, flux collected by the ring 32 flows through the armature 33 in a direction to aid the normal armature-to-pole gap flux at the right hand side of the armature, and to oppose the normal armature-to-pole gap flux at the left hand side, resulting in an unbalance of gap forces and closing the right hand gap. This closes the left hand contact, which causes current to flow in coil 26a, repelling the south pole of the rotor and attracting the north pole, and resulting in clockwise rotation of the rotor. As soon as the poles have reversed their position, as shown in FIGURE 8, the flux reverses its direction through the armature, causing current to flow in 26b, resulting in a continuance of the clockwise rotation of the rotor. The position of the switch is approximately 10 degrees in advance of the motor coil centerline to compensate for the inertia time constant of the switch armature. The rotor magnet pole phasing relative to the reticle of the optical system is approximately 30 degrees counterclockwise from the reticle spoke section start, with clockwise rotation of the rotor.

Flight control of the missile is accomplished by means of a set of fixed-angle, retractable wings housed in section 13 shown in FIGURE 1. The missile must roll continuously for these wings to have effect. This roll may be established by various methods. One such method is the use of canted rocket nozzles while another method is the use of canted tail fins.

In the preferred embodiment disclosed herein, the reticle or chopper spins at approximately 70 c.p.s. with respect to the air-frame, generating a 70 c.p.s. voltage in the reference coil. Since the airframe rotates at a roll rate $\dot{\phi}$, the reticle also produces a target error signal at a frequency of $(70+\phi)$ c.p.s. These two signals (target-error and reference) are compared in a phase demodulator, which produces a sinusoidal signal of frequency $\phi$ of proper phase, as shown in FIGURE 9.

The wing servo is adjusted to extend the wings whenever the demodulator voltage exceeds a particular bias voltage, as shown. Consequently, the wings are extended for a portion of each roll cycle; the center of the extension period coincides with the desired direction of lift, and the width of the period is a function of the error signal magnitude. This wing extended time is called the "lift sector." The desired-direction lift and quadrature lift which result are also shown in FIGURE 9.

Actually, the lift force generated by the wings is only a fraction of the required lift force. The remainder of the force is provided by the fuselage. Since body angle of attack lags behind wing force in time, the reference coil must be rotated through a lag angle $\theta$ with respect to the wings. This lag angle is such that the net lift force (wing plus body) is in the direction of the target.

The electronics system, a portion of which forms the electronics section 12 shown in FIGURE 1, preferably utilizes transistors as active elements to keep power requirements and packaging volume at a minimum. The block diagram, FIGURE 10, of the electronics system shows what portion of the electronics resides in the seeker head. In the invention disclosed herein, an external battery, connected to the missile through a quick disconnect plug, may be used to spin the gyro up to its proper speed. This external battery reduces weight in the missile and leaves more room for the other missile components.

The automatic gain control shown in FIGURE 10 is used since the output from the sensitive cell varies throughout a wide range and, as a result, the gain of the small signal amplifier must be varied to avoid excessive distortion and to improve the signal-to-noise ratio. The actual circuitry corresponding to the block diagram is conventional and within the scope of one skilled in the art.

The control surface actuator, in a presently preferred embodiment, is a solenoid actuated, spring return device, illustrated by FIGURES 11, 12 and 13. A torroidal coil 35, comprising an accelerating winding 35a and a holding winding 35b is fitted over a core 36 and enclosed in a case 37. An armature 41, fastened to a shaft 42, is urged away from core 36 by compressed springs, such as spring 43, shown in FIGURE 13. Application of current to coils 35 attracts armature 41 to core 36, and compressing the springs such as spring 43. A crosshead 44, secured to shaft 42, engages drive pins 45 and 46, mounted on sector gears 47 and 51, respectively. Sector gears 47 and 51 pivot on bearing shafts 52 and 53, respectively, and mesh with wing gears 54 and 55 respectively. Wing gears 54 and 55 are secured to wings 34a and 34b, respectively. Pivoting of sector gears 47 and 51 rotate wing gears 54 and 55, about wing bearings 56 and 57, and extend wings 34a and 34b into the airstream.

As illustrated in FIGURE 14, application of the wing extend signal on conductor 61 to electronic switch 62 enables application of current to accelerate coil 35a and holding coil 35b. Application of actuating current to both coils enables more rapid extension of the wings against the force of the airstream. However, once the wings are extended, less force is required to hold them, and means are provided to open the circuit to accelerating coil 35a. A normally closed, snap action switch 63, connected in series with accelerating coil 35a, is mounted so that a lever 64 is actuated by shaft 42, depressing switch operating button 65 and opening the switch contacts at the end of travel of armature 41 when the wings are substantially fully extended into the airstream.

After the missile rolls through the lift sector, the solenoid current is cut off. The compressed springs and the force of the airstream force the wings back, retracting into the slots in control section 13.

In another embodiment, a rotary solenoid 66, known by the trade name of Ledex and manufactured by G. H. Leland Co., wherein ball bearings riding an inclined plane convert linear to rotary motion, is employed, although other rotary actuators wherein a shaft is rotated a fixed amount upon application of an electric current are also contemplated. Rotary solenoid 66 rotates a shaft 67 upon application of current. A crank 71, secured to shaft 67, is connected by two tie rods 72 and 73 to wings 34, whereby rotation of crank 71 exerts tension on tie rods 72 and 73, and rotates wings 34 about bearings 56 and 57.

While there are various ways in which this missile control system can be used, the following mode of operation is preferred: The external battery is used to spin the gyro head up to required speed and the missile is pointed toward the target. The seeker head acquires the target and the sensitive cell produces electrical impulses called an error signal.

The small signal amplifier amplifies the error signal. The output of the amplifier is made audible in a small speaker which may be conveniently mounted on the launcher, and notifies an operator that the target has been acquired. Other methods of notifying the operator of target acquisition, such as a signal light or meter may be employed. The error signal is then filtered to the desired bandwidth, demodulated, inverted in phase and transmitted to a phase demodulator and a precession coil preamplifier having a push-pull output. The precession coils produce a magnetic inductance field in accordance with the signal received from the pre-amplifier. This field produces a torque on the rotating magnet causing the seeker head to more accurately orient itself with the target.

The rotating magnet also induces a voltage in the reference coils. This reference voltage is compared with the error signal in the phase demodulator. The output of the phase demodulator is amplified and fed to the electronic switch which controls the actuator and thus the movement of the shaft linkage and control wings.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What we claim is:

1. A rolling missile flight path control system comprising a target seeker head including means for generating electrical signals in accordance with the relative positions of the missile and target and means for orienting said seeker head with said target, circuit means connected to said seeker head responsive to said electrical signals for generating wing actuator control signals, fixed incidence lifting control wings, and actuator means for selectively extending said control wings in response to said wing actuator control signals, said actuator means including a solenoid having an accelerating coil and a holding coil responsive to said wing actuator control signals, an armature including a shaft coaxial with said solenoid and translated in response to a wing actuator control signal in said accelerating coil and holding coil, spring means compressed by said armature, linkage means connected to said armature for extending said wings upon actuation of said accelerating coil and holding coil by said wing actuator control signal, said linkage means including a crosshead on said shaft, a pair of sector gears having drive pins in said cross head, and a gear secured to each of said wings meshing with a sector gear, whereby attraction of said armature by said solenoid rotates said wings to an extended position, a normally closed switch actuated to disconnect said accelerating coil upon extension of said wings, said compressed spring means retracting said wings upon cutoff of said wing actuator control signal, whereby said wings are selectively extended to provide lift only during the portion of the roll cycle of said missile required to keep the missile on a target intercept course.

References Cited

UNITED STATES PATENTS

| | | | |
|---|---|---|---|
| 2,873,412 | 2/1959 | Pratt | 317—189 |
| 2,444,471 | 7/1948 | Samiran | 200—102 |
| 3,010,677 | 11/1961 | Guthrie et al. | 244—14 |

OTHER REFERENCES

Wagner: "Guidance and Control of the Henschel Missile," History of German Guided Missiles Development, pp. 8–23.

RODNEY D. BENNETT, Jr., Primary Examiner

M. F. HUBLER, Assistant Examiner

U.S. Cl. X.R.

244—3.21